Patented Apr. 21, 1936

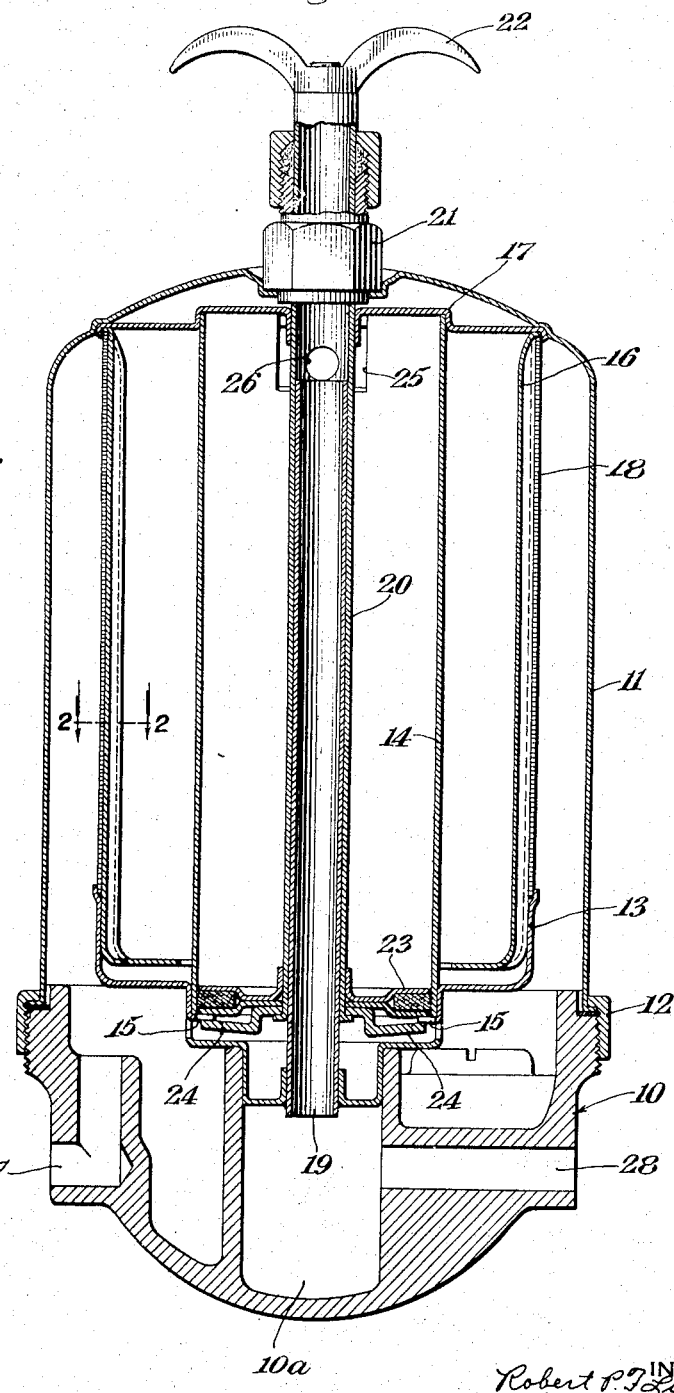

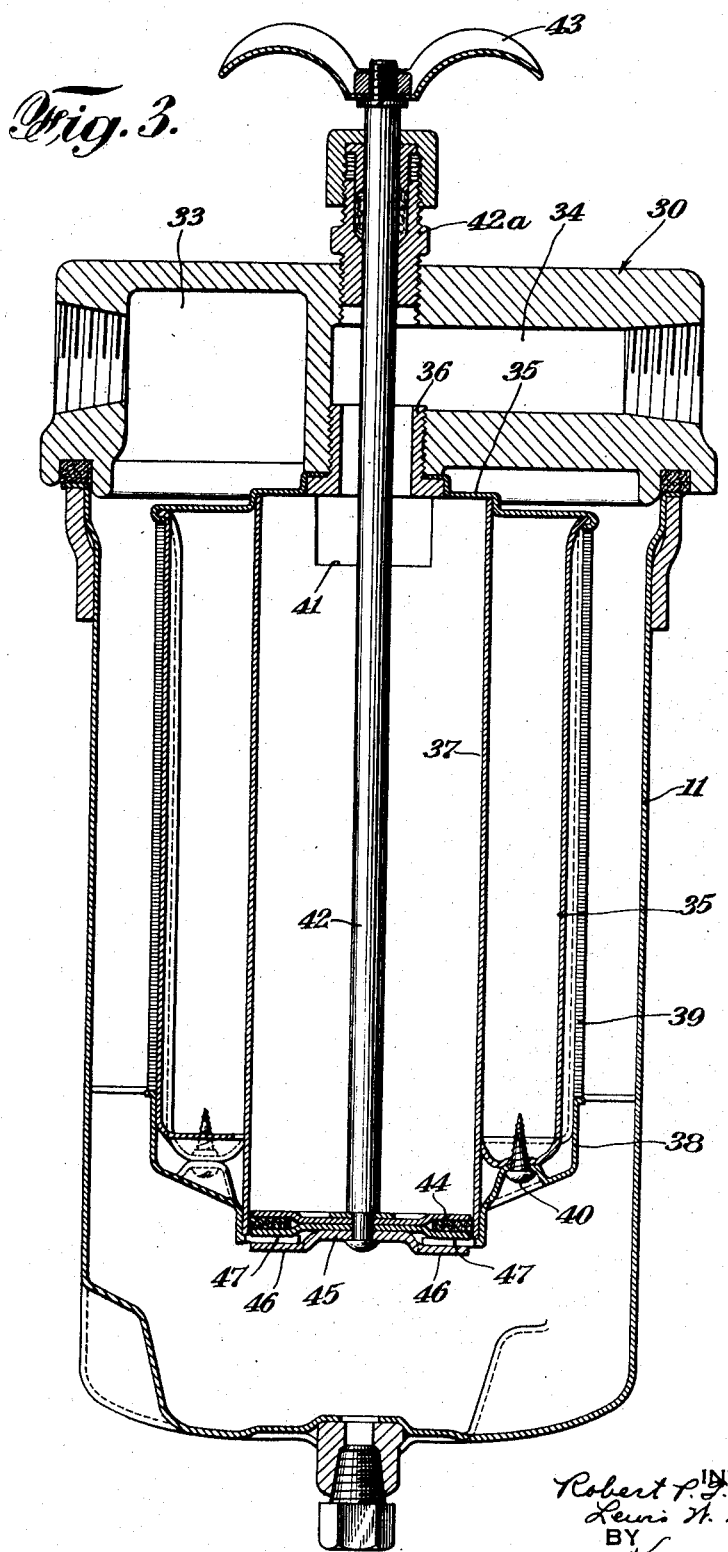

2,038,355

UNITED STATES PATENT OFFICE 2,038,355

FILTER

Robert P. F. Liddell, Darien, Conn., and Lewis W. Williams, Morris Township, Morris County, N. J., assignors to Motor Improvements, Inc., Newark, N. J., a corporation of Delaware Application December 11, 1930, Serial No. 501,558
Renewed March 1, 1934

15 Claims. (Cl. 210—167)

This invention relates to filters and has for an object an improved filter having provision for directing filtered fluid reversely through the filter unit for the purpose of removing therefrom solid material filtered from the fluid and collected by the filtering unit.

A filter embodying this invention comprises a casing which is divided into inlet and outlet sections by a filtering unit. Manually operable means are provided for decreasing the capacity of the outlet section and increasing the capacity of the inlet section to cause filtered fluid to flow reversely through the filtering unit without any change in the contents of the casing, the reverse flow being effective to remove the filter cake from the filter unit. Preferably, the filtering unit comprises a metal cylinder having a large number of narrow slots, the cylinder surrounding and being supported by a fluted drum. The flutes in the drum form channels communicating with the interior of the drum and through which the filtered oil is conducted. Within the drum there is provided a tube having communication both with the interior of the drum and with the inlet section of the casing. This tube is provided at the end communicating with the inlet section with a closure and manually operable means are provided for moving such closure longitudinally of the tube. Such movement of the closure decreases the capacity of the outlet section and increases the capacity of the inlet section so that filtered fluid is forced reversely through the filtering cylinder and unfiltered oil follows the closure into the tube. Return of the closure to its original position restores the normal capacities of the two sections and the tube is again filled with filtered oil.

In such a filter, the filter unit is cleaned without change in the contents of the casing. Furthermore, the cleaning of the filtering unit is effected without any loss of filtered or unfiltered fluid.

Other objects, novel features and advantages of this invention will be apparent from the following specification and accompanying drawings, wherein:

Fig. 1 is a vertical section through one embodiment of the invention;

Fig. 2 is an enlarged section on the line 2—2 of Fig. 1, and

Fig. 3 is a vertical section through a modified form of the invention.

In Fig. 1, 10 is a base to which a shell 11 is attached by means of an annular nut 12 to form a casing. A cup-shaped sheet metal member 13 has portions of three different diameters and the portion of smallest diameter projects into a well 10a formed in the base. A tube 14 has its lower end fitted into the portion of intermediate diameter and resting upon tongues 15 bent inwardly from the wall of said portion. A fluted drum 16 has its lower end extending into the largest diameter portion of the cup 13 and in the bottom wall of the drum there is provided an opening through which the tube 14 extends, the edge of this opening being serrated. In the top wall of the drum 16 there is provided an offset portion 17 into which the upper end of the tube 14 projects. The upper end of the drum 16 engages the wall of the casing 11 by which the drum is held firmly in position.

A metal filtering unit 18 surrounds the drum 16 from its upper end down to the rim of the cup 13. This filtering unit comprises a cylinder comprising a helix wound from a thin metal ribbon with the wide faces normal to the axis of the helix, the ribbon being preformed with definite curvature so that its turns lie smoothly in contact with each other. This ribbon is of minute thickness and is provided at intervals with spaced ribs 19 which space apart the adjacent turns and form filtering slots through which the fluid to be filtered is passed. The ribbon preferably is approximately .045 inch wide and .006 inch thick while the ribs are preferably .001 to .002 inch in height.

A tube 19 passes through and is supported by the smallest diameter portion of the cup 13 and extends nearly to the upper end of the tube 14. A sleeve 20 fits over the tube 19 and is slidably mounted and sealed in a fitting 21, a handle 22 being provided at the end of the sleeve. To the lower end of the sleeve 21 there is attached a pump plunger 23 which may be reciprocated in a tube 14 by in and out movement of the sleeve 20. At the lower end of the sleeve 20 is attached a member having arms 24 which are adapted to underlie the tongues 15 and lock the sleeve in the position shown in Fig. 1. Rotation of the sleeve 20 disengages the arms from the tongues and permits operation of the sleeve. In the upper end of the tube 14 there is provided an aperture 25 and also an aperture 26 is provided in the upper part of the sleeve 20. An inlet channel 27 is provided in the base 10 for conducting fluid to be filtered into the space between the filter unit and the casing wall and an outlet 28 is provided in the base for discharging the filtered fluid.

The filter may be connected in any filtering system by means of suitable pipes. Preferably, the filter is used in connection with the lubrication system of an internal combustion engine and the crank case oil is passed through the filter for the purpose of removing contaminating material in the oil.

The incoming oil is delivered into the space between the filtering unit and the casing from whence it flows through the slots in the cylinder 18 into the channels formed by the flutes in the drum, these channels communicating with the chamber formed by the bottom wall of the drum and the member 15. The serrated edge of the aperture in the bottom wall of the drum 16 provides a passageway through which the filtered fluid flows into the interior of the drum. The filtered fluid flows from the interior of the drum through the aperture 25 into the tube 14 to fill it up and from the tube 14 through the aperture 26 into the tube 19, through said tube into the well 10a and then out through the outlet 28. The foreign material in the oil is collected on the surface of the cylinder 18 and, at any time that oil is not being supplied to the filter, the filtering unit may be cleaned by causing reverse flow of filtered fluid through such unit. This is accomplished by upward pull on the handle 22 which through the medium of the sleeve 20 lifts the plunger 23 and displaces the oil in the cylinder above the plunger through the aperture 25. The displaced oil flows downwardly around the tube 14 and upwardly through the channels formed by the flutes and then reversely through the slots in the cylinder 18. Such flow of oil is permitted due to the fact that the unfiltered oil in the casing is permitted to flow into the tube 14 through the apertures produced in the striking up of the tongues 25. With this arrangement, there is no change in the contents of the filter, but sufficient reverse flow is established to remove the filter cake from the filter unit. Upon return of the plunger 23 to its original position, the unfiltered oil will be forced out of the tube 14 and back into the space between the filter unit and the casing, and the cylinder 14 will be again filled with filtered oil. This operation may be repeated several times if desirable, or necessary.

In the modification disclosed in Fig. 3, 30 is a head to which a shell 11 is attached by means of a collar carried by clamps, not shown. The head is provided with an inlet passage 33 and an outlet passage 34. A fluted drum 35 has two offset portions and a tubular fitting 36 passes through the portion of smaller diameter and is threaded into the head to attach the drum thereto. Within the drum 35 there is provided a tube 37 having its upper end fitting into the second offset portion of the top of the drum.

A cup-shaped member 38 receives the lower end of the drum 35 and between the upper edge of this member and the top of the drum there is arranged a cylindrical filtering unit 39 formed of a helix wound from flat metal ribbon having projections, the member 38 being held in place by screws 40. The cylinder 37 extends through an aperture in the bottom wall of the drum 35, this aperture being formed with a serrated edge. The channels formed by the flutes in the drum communicate with the chamber formed between the bottom wall of the drum 35 and the cup-shaped member 38 and this chamber communicates with the interior of the drum through the passageway formed by the serrated edge of the aperture through which the tube 37 extends. An aperture 41 in the upper end of the tube 37 provides communication between the interior of the drum and the interior of the tube 37. A rod 42 is slidably mounted in a fitting 42a provided in the head 30 and is equipped with a handle 43. This rod extends through the fitting 36 and through the bottom of the tube 37. A pump plunger 44 is attached to the bottom of the rod 42. A member 45 is attached to the bottom of the rod 42 and is provided with arms 46 which are adapted to underlie arms 47 projecting inwardly from the bottom of the tube 37, thereby locking the plunger. The arms may be disengaged by rotating the rod 42.

Oil to be filtered is introduced through the inlet 33 into the space between the filter unit and the casing wall and after passing through the slots in the filter unit flow down the channels into the chamber between the bottom wall of the drum and the cup-shaped member 38. From this chamber, it flows upwardly around the tube 37 through the aperture 41, flows up the tube 37 and then flows out through the nipple 36 and outlet passage 34.

The cake collecting on the exterior surface of the filter unit 39 is removed by reverse flow of oil through the filter unit in a manner similar to that described in the modification shown in Fig. 1. Upward movement of the plunger 44 causes filtered oil to flow from the tube 37 through the aperture 41 into the interior of the drum 35 and then through the channels formed by the flutes and outwardly through the slots in the filter unit 39, while unfiltered oil flows upwardly into the tube 37 to permit the reverse flow just referred to. The return of the pump plunger 44 to its original position also returns the oil to the position from which it was displaced.

It is of course apparent that various modifications may be made in the structure above described, without in any way departing from the spirit of the invention as defined in the appended claims.

We claim:

1. In a filter, a casing, means including one or more fixed, rigid filtering units dividing said casing into inlet and outlet sections, and means for reducing the capacity of the outlet section and increasing the capacity of the inlet section to effect reverse flow of filtered fluid through said unit.

2. A filter comprising a casing, means including a fixed, rigid filter unit dividing said casing into inlet and outlet sections, and reciprocating plunger means for reducing the capacity of said outlet secti 1 and increasing the capacity of said inlet secti to effect reverse flow of filtered fluid through the filtering unit.

3. A filter comprising a casing, a cylindrical filtering unit within said casing, a tube arranged within said filtering unit and communicating with the interior of the filtering unit and with the space between the filtering unit and the casing wall, an inlet communicating with said casing, an outlet communicating with said tube, and a plunger mounted in said tube for reciprocation to effect reverse flow of filtered fluid through said filtering unit.

4. A filter comprising a casing having an inlet, fluted drum supported in said casing, a metal cylindrical filtering unit surrounding said drum and forming channels with said flutes, a cap fitting over one end of said drum and forming therewith a chamber communicating with said channels and with the interior of said drum, a tube arranged within said drum and communicating with the interior of said drum and with the space between the casing wall and the filtering unit, a plunger reciprocally mounted in said tube, said tube being in communication with said outlet.

5. A filter comprising a casing, a fixed, rigid filtering unit within said casing dividing the same into inlet and outlet sections, and manually operable means for reducing the capacity of the outlet section and increasing the capacity of the inlet section to effect reverse flow of filtered fluid through said unit.

6. A filter comprising a casing, a fixed, rigid filtering unit within said casing dividing the same into inlet and outlet sections, and manually operable means for forcing filtered fluid reversely through said filtering unit without reduction in the volume of fluid in the casing.

7. In a filter, a casing, a filtering unit dividing said casing into inlet and outlet sections, a passageway communicating with said inlet and outlet sections, and a closure for said passageway, said closure being movable in said passageway to cause filtered fluid to flow reversely through said unit without change in the contents of said casing.

8. A filter comprising a casing, a cylindrical filtering unit within said casing, a tube communicating with the interior of said filtering unit and with the space between the filtering unit and said casing, and a reciprocating piston mounted in said tube for causing filtered fluid to flow reversely through said unit without change in the contents of the casing.

9. A filter comprising a casing, a hollow support within said casing, a filtering member surrounding said support, said support being provided with passageways to conduct filtered fluid into the interior thereof, a tube within said support communicating with the interior thereof and with the space between the filter member and the casing, and a plunger slidably mounted in said tube.

10. A filter comprising a casing, a slotted cylinder, a hollow support surrounded by said cylinder and having passageways for conducting filtered fluid into the interior thereof, a tube communicating at one end with the interior of said support and at the other end with the space between said cylinder and casing, and a piston slidably mounted in said tube.

11. A filter comprising a casing, a slotted cylinder, a hollow support surrounded by said cylinder and having passageways for conducting filtered fluid into the interior thereof, a tube arranged within said support, and a piston slidably mounted in said tube, said tube being in communication at one end with the space between the tube and said support and at the other end with the space between the cylinder and the casing.

12. A filter comprising a casing, a slotted cylinder, a fluted cylindrical drum surrounding by said cylinder, a cap forming with the end of said drum a chamber communicating with the flutes, a tube within said drum, said tube being in communication at one end with the space between it and the drum and at the other end with the space between the cylinder and the casing, a piston slidably mounted in said tube, and a passageway connecting said chamber with the space between said tube and drum.

13. A filter comprising a fluted drum, a slotted cylinder surrounding said drum, a cap fitting over one end of said drum and forming therewith a chamber communicating with said flutes, a tube arranged within said drum, said tube being supported at one end by said cap and passing through an aperture in the end of the drum, clearance being provided between the edge of said aperture and the tube, and a plunger slidably mounted in said tube, said tube being in communication at one end with the interior of said drum and at the other end with the space surrounding said drum.

14. A filter comprising a fluted drum, a slotted cylinder surrounding said drum, a cap fitting over one end of said drum and forming therewith a chamber communicating with said flutes, a tube arranged within said drum, said tube being supported at one end by said cap and passing through an aperture in the end of the drum, clearance being provided between the edge of said aperture and the tube, a plunger slidably mounted in said tube, said tube being in communication at one end with the interior of said drum and at the other end with the space surrounding said drum, and an outlet leading from the interior of said tube, and an inlet communicating with the space exterior of said drum.

15. A filter comprising a casing, a slotted cylinder, a hollow support surrounded by said cylinder and having passageways for conducting filtered fluid into the interior thereof, a tube communicating at one end with the interior of said support and at the other end with the space between said cylinder and casing, a piston slidably mounted in said tube, an inlet for supplying fluid to be filtered, and an outlet for discharging filtered fluid.

ROBERT P. F. LIDDELL.
LEWIS W. WILLIAMS.